March 9, 1943.  F. B. LUTMAN  2,313,651
HEDGE SHEARS
Filed March 13, 1940  3 Sheets-Sheet 3
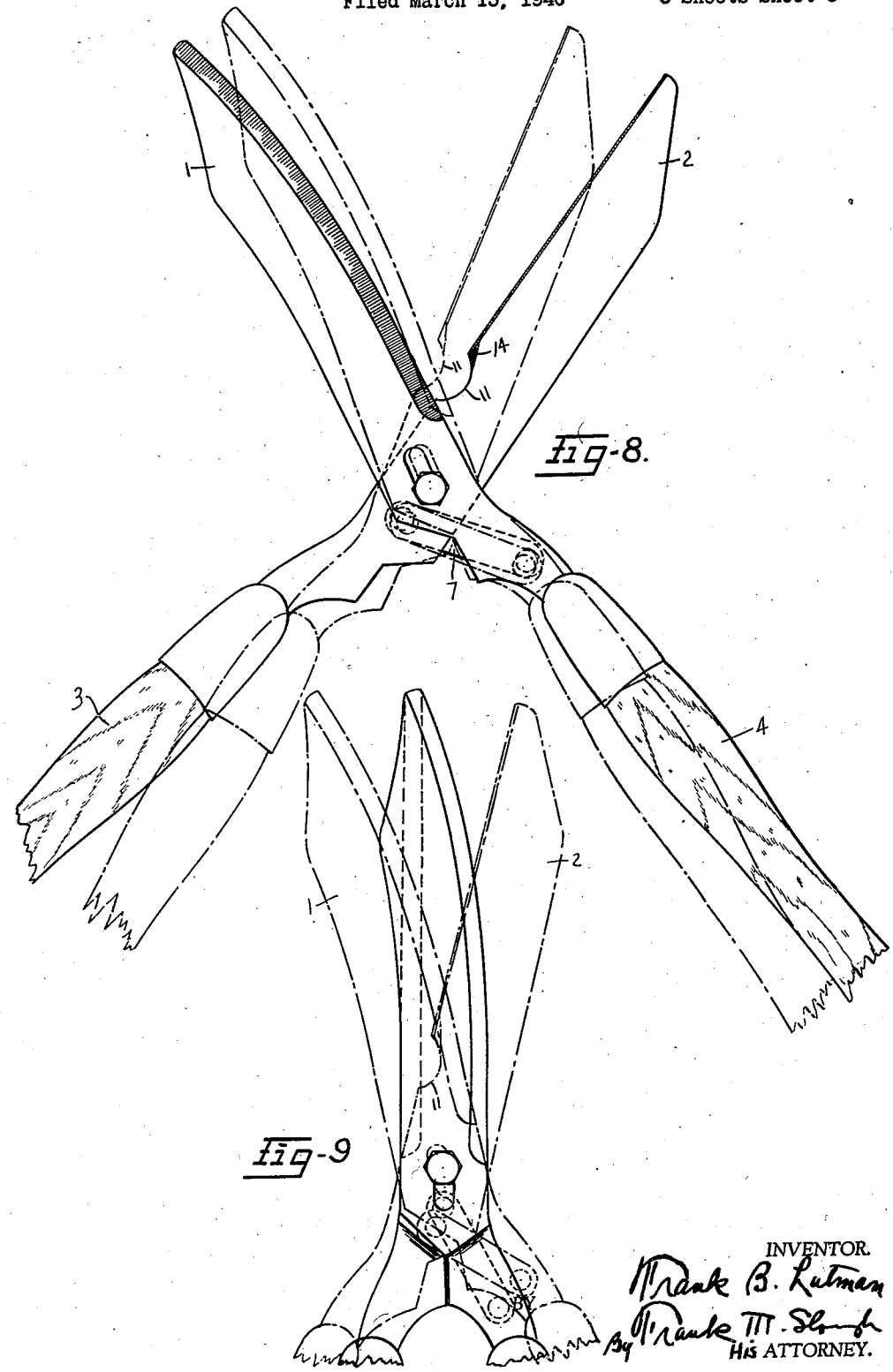

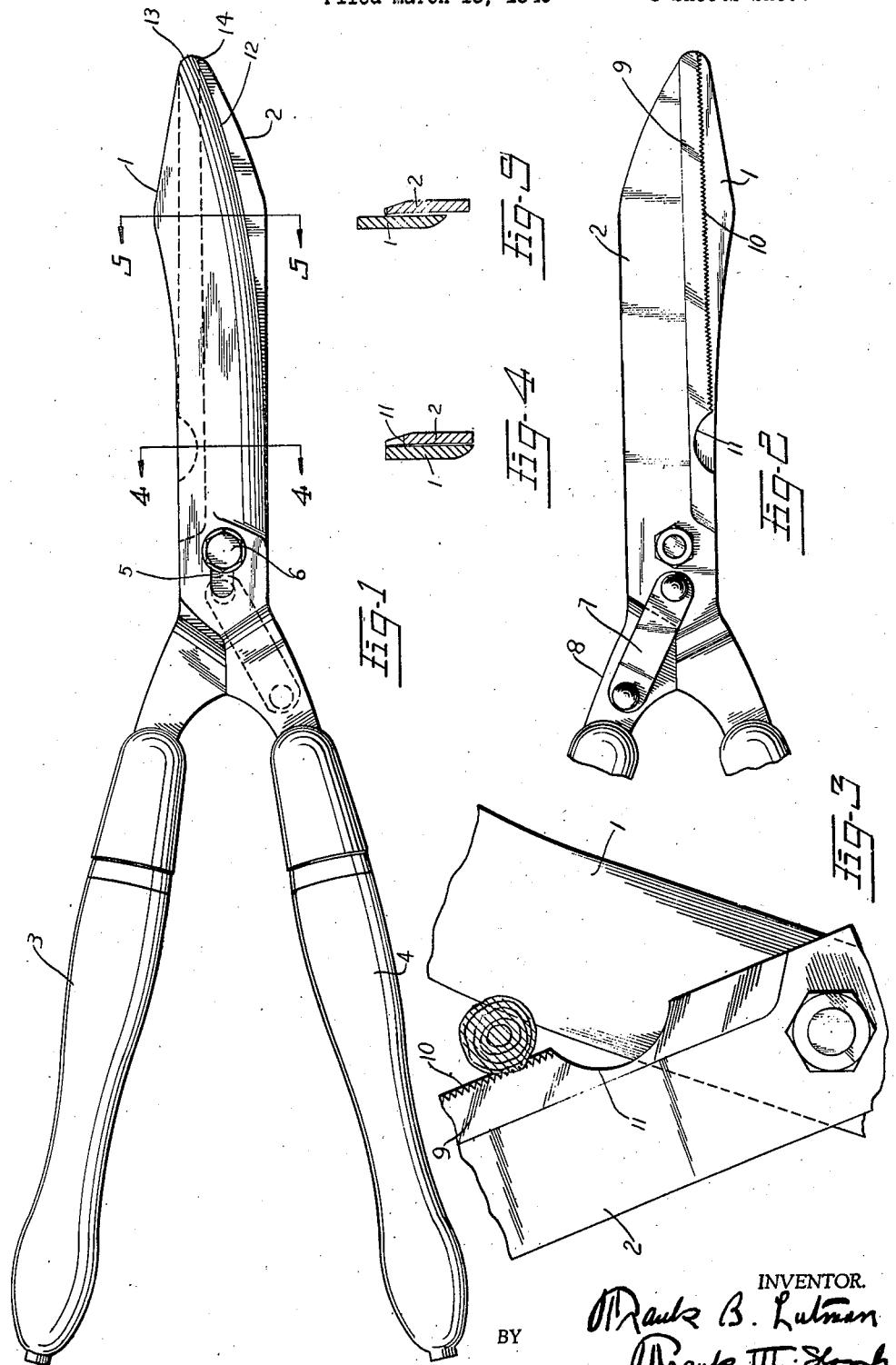

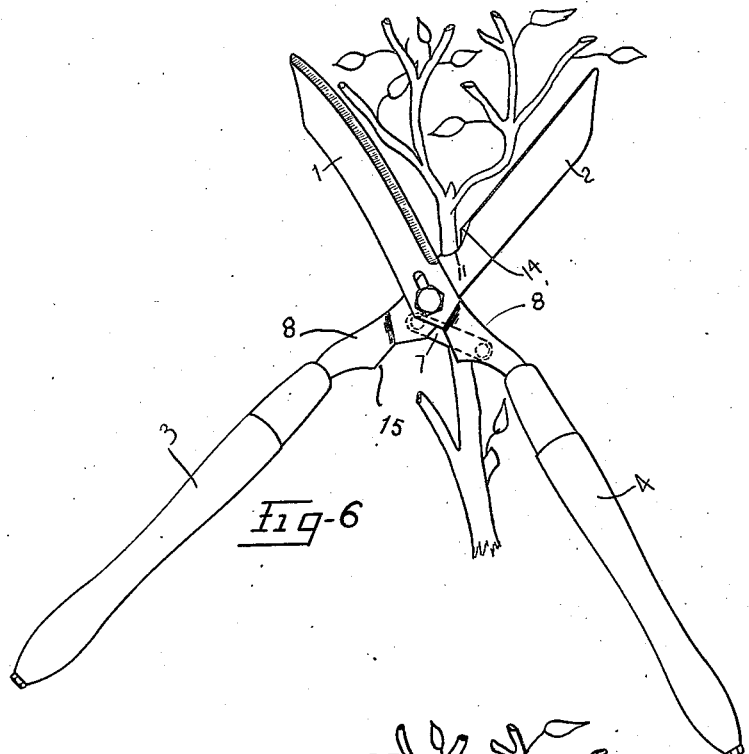
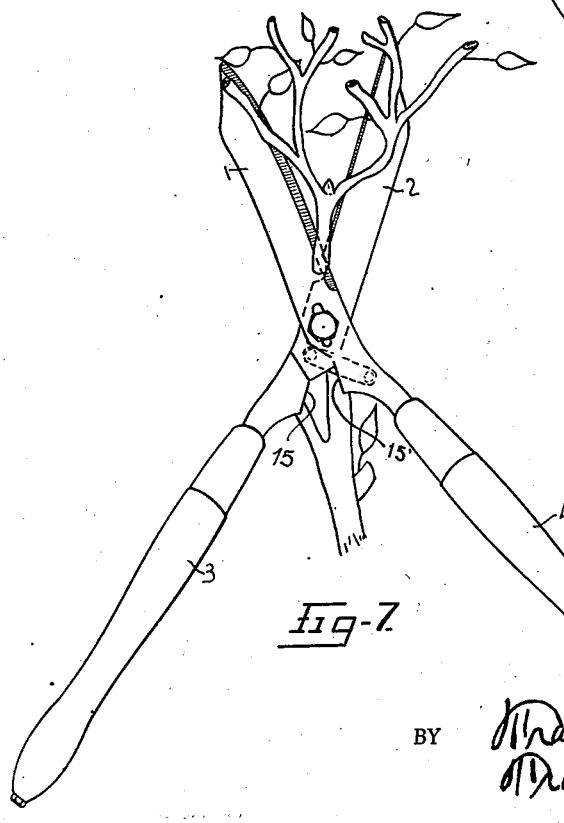

Patented Mar. 9, 1943

2,313,651

UNITED STATES PATENT OFFICE 2,313,651

HEDGE SHEARS

Frank B. Lutman, Willoughby, Ohio, assignor to The American Fork & Hoe Company, Cleveland, Ohio, a corporation of Ohio Application March 13, 1940, Serial No. 323,749

1 Claim. (Cl. 30—239)

My invention relates to shears and relates more particularly to shears adapted for use as hedge shears, pruning shears or the like.

It is an object of my invention to provide a shears of the type described which have a draw cut action.

Another object of my invention is to provide in an improved shears of the type described a construction which affords a draw cut with an improved leverage action and greater cutting power.

Another object of my invention is to provide in an improved shears of the type described a shearing motion whereby the twigs, branches of the tree or other material will be drawn through the shears without pinching or slipping.

Another object of my invention is to provide an improved shears of the type described whereby a draw cut may be easily effected upon a round object such as the branch of a tree, a twig, etc.

Other objects of my invention and the invention itself will become increasingly apparent from a consideration of the following description in which:

Fig. 1 is a top plan view of the shears of my invention showing the shears closed;

Fig. 2 is a bottom plan view of the shears shown in Fig. 1;

Fig. 3 is a fragmentary view of the shears of my invention showing a branch retained thereby;

Fig. 4 is a sectional view taken from the plane 4—4 of Fig. 1;

Fig. 5 is a sectional view taken from the plane 5—5 of Fig. 1;

Fig. 6 is a side elevational view of the shears of Fig. 1 showing the shears in full open position;

Fig. 7 is a view similar to that of Fig. 6 but showing the shears in only partially open position;

Fig. 8 is a side elevational view of the shears of Fig. 1 and the dotted lines indicate optional positions which certain of the parts assume when the shears are being closed; and Fig. 9 is a view similar to Fig. 8 showing the parts of said hedge shears in certain different positions.

Referring to the drawings, at 1, I show the top blade and at 2, the bottom blade of a hedge shears, each of which has outer handle or grip portions 3 and 4 respectively associated therewith.

The upper blade 1 is provided with an elongated slot 5 adjacent the shank portion thereof through which a pivot bolt 6 is adapted to project. At a point eccentric to the bolt which is projected through the lower blade, a lever or strap member 7, is attached to the shank 8 of the top blade and at its opposite end is pivoted to the rear end of the bottom blade 2. The lever 7 is preferably of S-shape to allow for the differences in position and height of the two blades and the points of attachment of the lever thereto. The bottom blade is further provided with a bevelled end portion 9 which is provided with a serrated edge portion 10 and a notch 11 which is adapted to hold the work such as heavy branches, etc., when trimming trees, shrubbery or the like as shown in Figs. 6 and 7. The upper blade 1 is provided with a curved and bevelled cutting edge 12, the arc of curvature generally extending from a point substantially in alignment with, but oppositely disposed to, the rearmost edge of the notch 11 disposed in the bottom blade to the tip of said upper blade. The ends 13 and 14 of said blades 1 and 2 are preferably blunt for the user's protection.

It is to be further noted that on the bottom blade adjacent the notch 11 on the upper face of said blade, the blade is cut or sheared away as shown in Fig. 6 at 14; this enables the rounded bevelled upper blade to contact the bottom blade with a smooth even friction throughout the cutting movement and further aids in the efficiency and ease of the operation.

When the handles 3 and 4 are grasped, one in either hand, the parts are in the position indicated in Figs. 1 and 2 and as the handles are moved farther apart by the operator, the upper blade is disposed at a generally obtuse angle to the lower blade; when the handles are in the farthest extended position, the parts have assumed the position indicated in solid lines in Figs. 6 and 8 and the entire notch in the lower blade is exposed; the blades are then placed around the work to be cut and the work is grasped generally within the notched area of the lower blade; the handles 3 and 4 and attached blades are then drawn together as shown in Figs. 7 and 9, and the upper blade is caused to impart a draw cut to the twig or branch and to sever the same; the operator by continuing to exert pressure on the handles, again brings the blades to the position shown in Fig. 1. The serrated portions of the bottom blades, which blade imparts a longitudinal straight cut to the twig, etc., assists in retaining the twig while the upper blade imparts the craw cut, above described thereto.

It is to be noted that when the blades are in the closed position shown in Fig. 1 that the pivot bolt 6 is disposed adjacent the upper terminus of the slot 5 in the upper blade and that the lever or strap member 7 attached to the shank and top blade and pivoted to the rear of the bottom blade is disposed downwardly and at an angle to said slot, which is disposed in a substantially vertical direction, and that, when the handles are extended and the blades drawn apart, the bolt 6 is disposed at the bottom of said slot and said slot disposed at an angle to the strap 7 which is then disposed in a generally horizontal direction, as shown in Figs. 6 and 8.

In operation, it should be noted that, as shown in Figs. 1, 6 to 9 inclusive, when the handles are pulled apart to open the blades that the bolt 6 maintains its position but that the upper blade rotates about the same and the slot disposed in said blade moves from the position shown in Fig. 1 to that shown in Fig. 8. It is further to be noted that the shank portions 8—8' of the shears are provided with extensions 15—15' which, when the shears are in closed position as illustrated in Fig. 1, act as stops to maintain the shears in such position.

While I have shown my invention as embodied in certain specific forms, my invention is not limited thereto. Numerous and extensive changes and modifications may be made therefrom without departing from the spirit of my invention.

I claim:

The combination with a pair of longitudinally extending blade members pivotally secured together and adapted to have reciprocatory movement with respect to each other, one of said blade members being provided with a substantially straight edge, said edge being bevelled throughout the greater part of its length and a portion of said bevelled surfaces being serrated, a notch provided in an unserrated portion of said bevelled surface adjacent the pivotal connection of said blade members, the other blade member having a generally curved cutting edge, said edge being bevelled throughout its greater extent, the arc of curvature of said curved cutting edge generally extending from a point substantially in alignment with the rearmost edge of said notch provided in said other blade member, movement of said blades outwardly with respect to each other causing the curved blade member to traverse the upper face of the other blade and to rest in its fartherest extended position adjacent said notched end of said blade, a portion of the surface of the said first named straight edge blade contiguous to said notch being cut away, subsequent movement of the blade members inwardly causing said upper blade to again traverse said lower blade and to impart a draw cut to any article gripped by said blades.

FRANK B. LUTMAN.